May 16, 1944.   R. L. FARNSWORTH   2,349,151
FOUR WHEEL VEHICLE DRIVE
Filed Jan. 20, 1942   3 Sheets-Sheet 2

INVENTOR,
Reuben L. Farnsworth
BY
Victor J. Evans & Co.
ATTORNEYS

May 16, 1944.          R. L. FARNSWORTH          2,349,151
                      FOUR WHEEL VEHICLE DRIVE
                        Filed Jan. 20, 1942          3 Sheets-Sheet 3

INVENTOR,
Reuben L. Farnsworth
BY
Victor J. Evans & Co.
ATTORNEYS

Patented May 16, 1944

2,349,151

UNITED STATES PATENT OFFICE 2,349,151

FOUR-WHEEL VEHICLE DRIVE

Reuben L. Farnsworth, Hazel Park, Mich.

Application January 20, 1942, Serial No. 427,522

5 Claims. (Cl. 180—18)

This invention relates to a four wheel drive, and has for an object to provide a four wheel drive, clutch and brake mechanism, and steering mechanism all completely housed to prevent access of mud and water, the housings being adapted to be filled with lubricant so that the parts need not be lubricated since the lubricant may be said to be sealed in by the housings.

A further object is to provide a device of this character in which a differential is eliminated and substituted therefor is a combined brake and disk clutch mechanism, the disk clutch mechanism being automatically operated by the steering mechanism in such manner that when a curve is being turned the wheels next to the curb will be disconnected from the power and the outer wheels will supply the traction to negotiate the turn.

A further object is to provide a device of this character in which all four wheels are positively driven so that no wheel spin can occur to grind down the mud, no twist on the body will occur due to the absence of torque, and in which the wheels on the same side will track each other forward and in reverse thus conserving power and minimizing wear on tires.

A further object is to provide a device of this character in which braking power is equalized at all times on the four wheels so that the brakes cannot become set harder on one wheel than on the others.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 5 is a detail sectional view showing one of the combined clutch and brake mechanisms in side elevation.

Figure 6 is a cross sectional view of the combined clutch and brake mechanism shown in Figure 5 with the housing thereof removed.

Figure 1:
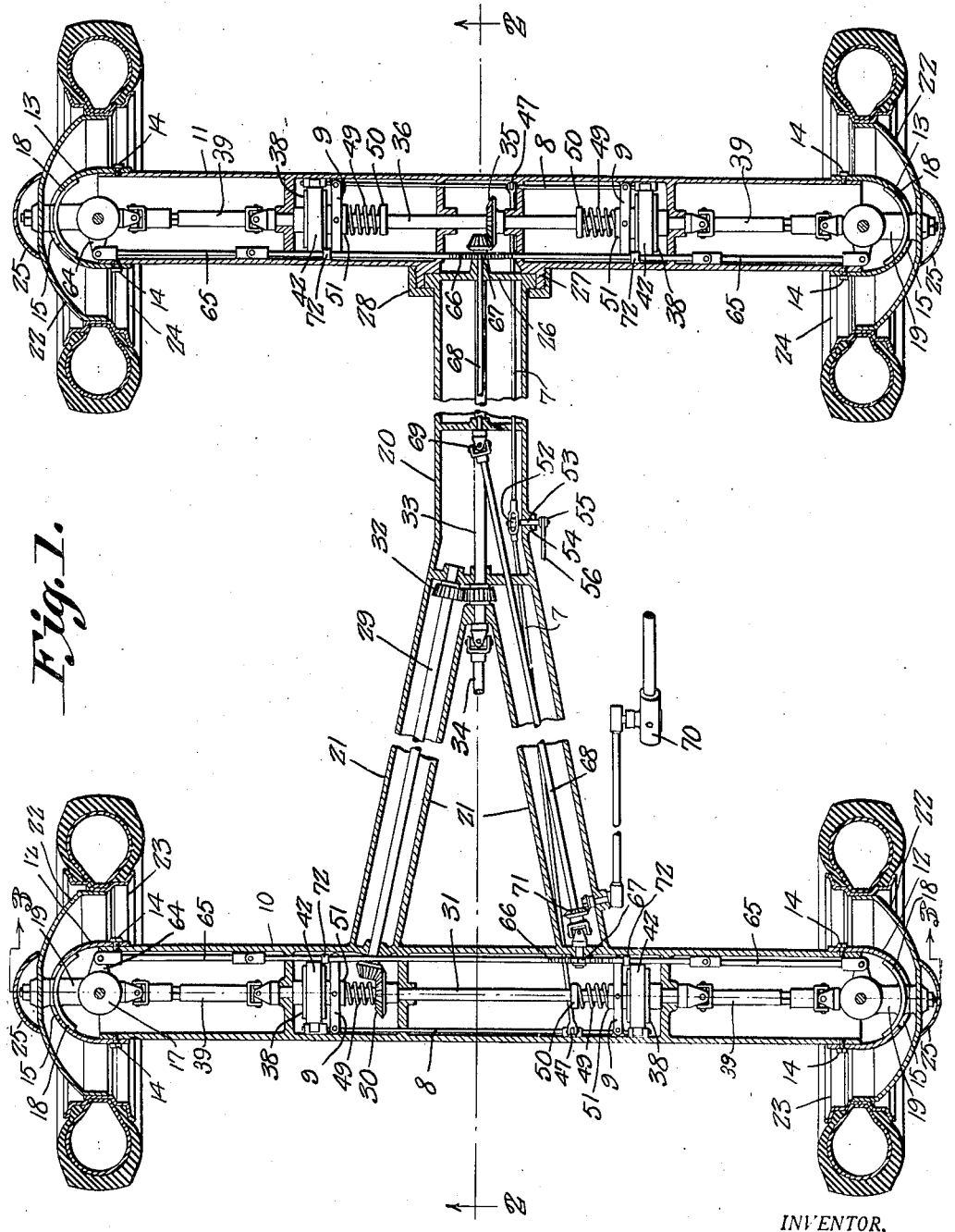
Figure 1 is a horizontal sectional view of a four wheel drive, clutch, brake, and steering mechanism constructed in accordance with the invention.

Referring now to the drawings in which like characters of reference designate similar parts in the various views, 10 designates a front cylindrical housing and 11 designates a rear cylindrical housing, the front housing being provided at the ends with substantially semicircular caps 12 and the rear housing being provided with semicircular caps 13 secured in position by screws 14. The caps are provided with respective horizontal slots 15 to permit the stub axles 16 of the steering knuckles 17 swinging in a horizontal plane. The slots are sealed leak proof by arcuate plates 18 secured to the stub axle housings 19. The housings 10 and 11, as well as a housing 20 having diverging branches 21, which housing connects the front and the rear housings 10 and 11, are all adapted to be filled with lubricant in sealed in condition so that a single supply of lubricant will last indefinitely.

The stub axles 16 of the steering knuckles are bolted to the disks 22 of the front ground wheels 23 and the rear ground wheels 24 to turn the wheels when the knuckles are turned, and the securing bolts are concealed by hub caps 25.

The housing 20 is connected to the rear housing 21 by a swivel joint including a flanged disk 26 which forms a closure in the rear end of the housing and is adapted to swivel in an annular bearing 27 fixed to the rear housing 11, the flange disk being confined in place by an annular retainer 28 of right angular cross section threadedly engaged with the bearing 27, see Figure 1. This connection permits the wheels on either side of the chassis dropping below or rising above the wheels on the other side of the chassis to conform to slopes and inequalities in the roadbed.

One of the branches 21 of the housing 20 houses a power transmitting shaft which is geared as shown at 30 to the front axle 31 in the housing 10 at the front end, and which is geared as shown at 32 to a power transmitting shaft 33 which is connected at the front end to the motor driven propeller shaft 34, and which is geared at the rear end, as shown at 35 to the rear axle 36. Thus the front and rear axles are power driven, and being connected to the steering knuckles of both front wheels and both rear wheels, respectively, in the usual manner, all four wheels are power driven positively.

The conventional differential is dispensed with and in lieu thereof each axle is equipped with a combined disk clutch and brake mechanism shown in detail in Figures 5 and 6. There are four of these mechanisms, controlling respective wheels. Each mechanism comprises multiple disks 37 having a back plate 38 fixed to a driven section 39 of the respective axles and having a shiftable front plate 40 splined and axially movable on the respective driving axles 31 and 36 and adapted for movement by a shipper 9 to frictionally interengage the disks 37 which are splined to a conventional flange 44, with each other and with the back plate 38, to move the clutch to "in" position. Retrograde movement of the shipper disengages the disk clutch in the usual manner. An annular brake band 42 is provided with a leather or other lining 43 disposed upon the usual flange 44 of the back plate 38 of the clutch, which forms the brake drum of the mechanism. The brake band is pivoted at one end to the respective housing 10 or 11 as the case may be, as shown at 45 and at the free end is engaged underneath a rock cam 46 which is moved by a link 47 connected to the rocking brake rod 8 to contract the brake band against pressure of a helical spring 48 to apply the brake when the disks of the clutch are partly or fully released against the pressure of a respective helical spring 49, see Figure 1, which is mounted on the respective front or rear axle as the case may be, and tends constantly to hold the clutch disks "in" position by pressure against a stop collar 50 on the axle and a hub 51 on the shiftable front plate 40.

Figure 2:
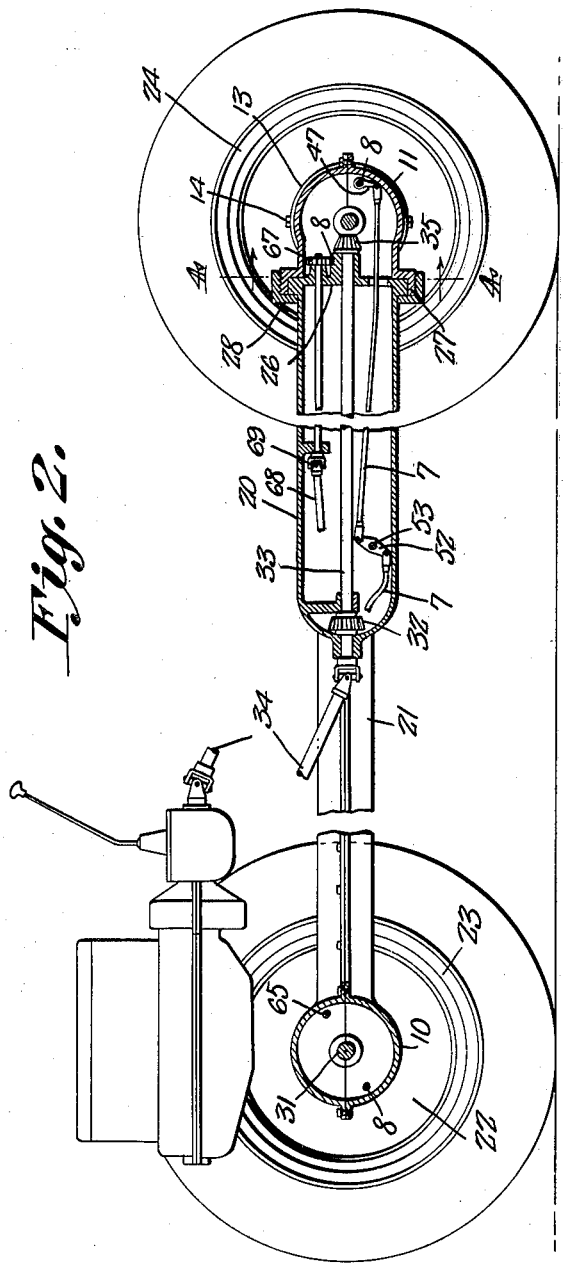
Figure 2 is a longitudinal sectional view taken on the line 2—2 of Figure 1.

The rocking brake rods 8 carry the cams 46, of both front and rear brakes and are mounted in suitable bearings in the respective housings. Each rocking brake rod is moved by a respective pull rod 7, see Figures 1, 2 and 5. The pull rods are connected to a rock lever 52 which is centrally secured to a rock shaft 53 which is mounted in a bearing 54 on the housing 20 and is provided outside the housing with a crank arm 55 which is connected to a brake rod 56 adapted to be operated by a suitable brake pedal not shown.

Figure 3:
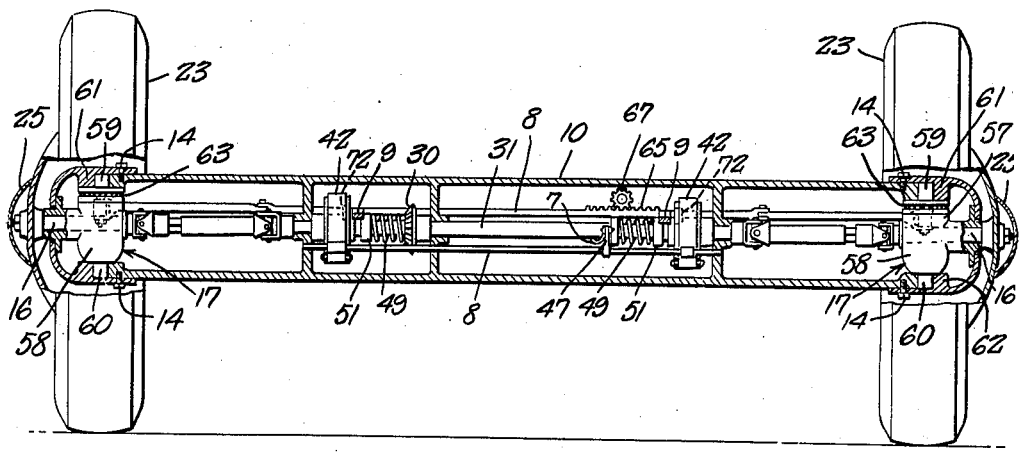
Figure 3 is a cross sectional view taken on the line 3—3 of Figure 1.
Figure 4:
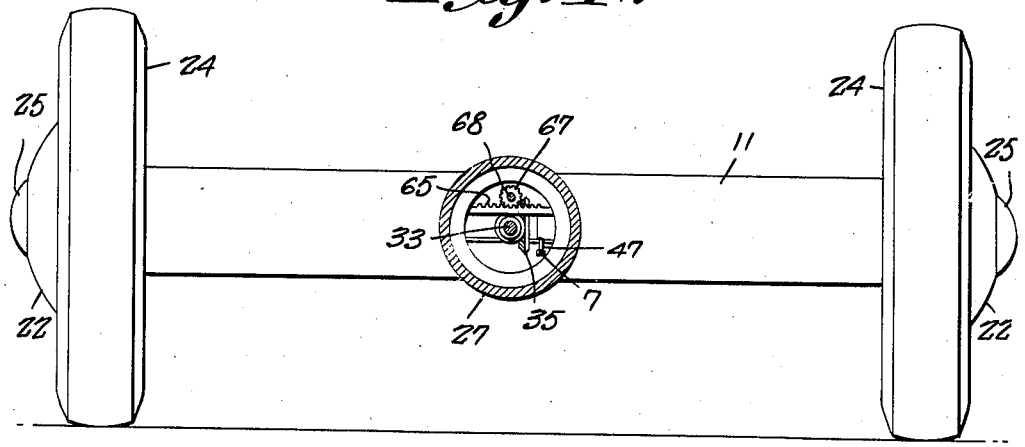
Figure 4 is a cross sectional view taken on the line 4—4 of Figure 2.

As best shown in Figure 3 each steering knuckle comprises upper and lower sections 57 and 58 having respective vertical gudgeons 59 and 60 which are journaled in two part bearings 61 and 62 carried by the caps 12 and 13 of the front and rear housings 10 and 11. Thrust bearings 63 are disposed between the two sections of the steering knuckles. The lower section of the steering knuckle is equipped with a crank arm 64, see Figure 1, and the crank arms of both steering knuckles of the front wheels, and of the rear wheels, are connected by endwise movable tie rods 65, respectively.

Each tie rod is provided with a respective rack 66 which is engaged by a pinion 67 carried by a respective shaft 68, again see Figure 1, both shafts being connected together by a universal joint 69. The shafts are turned in unison by a conventional steering gear 70 which is geared to one of the shafts as shown at 71.

All four wheels are steered simultaneously. However to negotiate curves it is desirable that the power be disconnected from the wheels close to the curb or collar of the roadbed and for this purpose the steering mechanism is caused to control the clutches in such manner that the clutches of the outside wheels remain connected to the power and the clutches of the inside wheels or wheels close to the curb or collar, are disconnected from the power. For this purpose the shipper 9 of each clutch is engaged by a respective collar 72 disposed between the free end of the respective shipper and the respective clutch. Consequently when the respective tie rod is moved endwise in one direction by manipulation of the steering gear one of the helical springs 49 will be compressed to release its clutch while the other will remain undisturbed to permit its respective clutch remaining in clutched position.

Since the operation of the parts has been described as the description of the parts progressed it is thought the invention will be fully understood without further explanation.

What is claimed is:

1. A four wheel drive comprising transverse front and rear axle housings, a longitudinal housing connected to the front and rear housings, steering knuckles in the front and rear housings, driven stub axles projecting from the respective steering knuckles, vehicle wheels fixed to the stub axles, driven axles in the front and rear housings, friction disk clutches on the axles for respective wheels, brake means assembled with the clutches, spring means on the driven axles normally holding the clutches in clutched position, means for declutching the clutches, steering means in the housings connected to the steering knuckles, means connected to the steering means for declutching both clutches of one pair of front and rear wheels while the clutches of the other pair of front and rear wheels remain clutched, and driving means in the housings connected to the driven axles.

2. The structure as of claim 1 and in which the brake means comprises a flanged backing plate for each disk clutch connected to the respective driven axle, a brake band on the flange of the backing plate, rock shafts connecting the pair of brake bands in each transverse housing, a cam on the rock shaft engaging a respective brake band for tightening the band, a crank arm on the shaft, and a pull rod connected to the crank arm for rocking the rock shaft.

3. The structure as of claim 1 and in which the spring means comprises a helical spring sleeved on the driven axle under tension between a respective collar on the driven axle, and the splined pressure plate for a respective disk clutch.

4. The structure as of claim 1 in which the steering means comprises crank arms on the steering knuckles, tie rods connecting the crank arms of each pair of steering knuckles having rack teeth, a shaft in the longitudinal housing having a pinion engaging the rack teeth, and a steering gear connected to said shaft.

5. The structure as of claim 1 and in which the driving means comprises a motor driven propeller shaft entering the longitudinal casing, and shafts in the longitudinal casing geared to the driven axles in the front and rear housings and geared to the propeller shaft.

REUBEN L. FARNSWORTH.